(12) United States Patent
Armstrong et al.

(10) Patent No.: US 6,682,841 B1
(45) Date of Patent: Jan. 27, 2004

(54) THERMAL MANAGEMENT FOR A VEHICLE MOUNTED FUEL CELL SYSTEM

(75) Inventors: Donald J. Armstrong, Troy, MI (US); David H. Swan, Monrovia, CA (US); Bart D. Hibbs, Altadena, CA (US); Brian R. Jensen, Simi Valley, CA (US); Gerald S. McAlwee, Sivlerlake, CA (US)

(73) Assignee: Delphi Technologies, Inc., Troy, MI (US)

( * ) Notice: Subject to any disclaimer, the term of this patent is extended or adjusted under 35 U.S.C. 154(b) by 314 days.

(21) Appl. No.: 09/838,596

(22) Filed: Apr. 19, 2001

Related U.S. Application Data

(60) Provisional application No. 60/198,299, filed on Apr. 19, 2000.

(51) Int. Cl.[7] ................................................. H01M 8/12
(52) U.S. Cl. .............................. 429/26; 429/12; 429/13
(58) Field of Search ............................... 429/12, 13, 26

(56) References Cited

U.S. PATENT DOCUMENTS 6,485,852 B1 * 11/2002 Miller et al. .................. 429/17

* cited by examiner

Primary Examiner—Carol Chaney
Assistant Examiner—Dah-Wei Yuan
(74) Attorney, Agent, or Firm—Jimmy L. Funke

(57) ABSTRACT

A method of thermal management of a fuel cell transportation vehicle is disclosed. The method comprises directing a first air having a temperature less than a chamber temperature towards at least one surface of a chamber. At least a portion of the air is passed through at least one chamber wall to an interior of the chamber, reducing the surface temperature.

11 Claims, 1 Drawing Sheet

THERMAL MANAGEMENT FOR A VEHICLE MOUNTED FUEL CELL SYSTEM

CROSS-REFERENCE TO RELATED APPLICATION

The present application claims the benefit of the filing date of U.S. Provisional Application No. 60/198,299, filed on Apr. 19, 2000, which is incorporated herein by reference.

BACKGROUND

Reductions in vehicle fuel consumption and emissions have been pursued by attempting to employ fuel cells. In addition, solid oxide fuel cells (SOFC) have been proposed to meet an increasing demand for on-board electricity. Vehicles equipped with a SOFC auxiliary power unit could allow operation of electrical accessories without drawing down batteries, even when the main propulsion system is not operating.

A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposite sides of an electrolyte. The oxidant passes over the oxygen electrode (cathode) while the fuel passes over the fuel electrode (anode). The primary outputs of fuel cells are electricity, heat, and water.

A SOFC is constructed entirely of solid-state materials, utilizing an ion conductive ceramic oxide as the electrolyte. A conventional electrochemical cell in a SOFC is comprised of an anode and a cathode with an electrolyte disposed therebetween. In a typical SOFC, a fuel flows to the anode where it is oxidized by oxygen ions from the electrolyte, producing electrons that are released to the external circuit, and mostly water and carbon dioxide are removed in the fuel flow stream. At the cathode, the oxidant accepts electrons from the external circuit to form oxygen ions. The oxygen ions migrate across the electrolyte to the anode. The flow of electrons through the external circuit provides for consumable or storable electrical power. However, each individual electrochemical cell generates a relatively small voltage. Higher voltages are attained by electrically connecting a plurality of electrochemical cells in series to form a stack.

The SOFC stack and other major system components operate at temperatures of about 600° C. up to about 1,000° C. At these temperatures, the components are glowing orange to white hot requiring radiation shielding and insulation to reduce energy loss and protect the surrounding vehicle surfaces. The thermal energy emitted from the system must be controlled for warm-up and cool-down periods, as well as during operation. Containing and controlling the thermal energy from the SOFC system is critical to the operation of the system. Conventional methods of containing and controlling the thermal energy from the SOFC system require the use of expensive insulation and heat pipes, which would be bulkier and heavier.

SUMMARY

The drawbacks and disadvantages of the prior art are overcome by the thermal management for a vehicle mounted solid oxide fuel cell system.

A method of thermal management of a fuel cell transportation vehicle is disclosed. The method comprises directing a first air having a temperature less than a chamber temperature towards at least one surface of the hot box. At least a portion of the air is passed through at least one chamber wall to an interior of the chamber, reducing the surface temperature.

A fuel cell transportation vehicle thermal management system is disclosed. The system comprises a chamber comprising insulation and a fuel cell stack in fluid communication with a reformer, a system enclosure disposed around the chamber, and a process air system in fluid communication with at least one surface of the chamber.

A method of thermal management of a fuel cell transportation vehicle is disclosed. The method comprises directing a first air having a temperature less than a chamber temperature towards at least one surface of the chamber. The surface temperature is reduced from a temperature of up to about 200° C. to a temperature of about 90° C. or less.

The above described and other features are exemplified by the following figures and detailed description.

BRIEF DESCRIPTION OF THE DRAWINGS

Referring now to the figures, wherein like elements are numbered alike.

DETAILED DESCRIPTION

Although described in connection with a SOFC, it is to be understood that the fuel cell stack integrated with waste energy recovery can be employed with any type of fuel cell such as a SOFC, PEM, phosphoric acid, molten carbonate, and the like.

Application of a fuel cell in a transportation vehicle imposes specific temperature, volume, and mass requirements, as well as "real world" factors such as fuel infrastructure, government regulations, and cost to be a successful product. Containing and controlling the thermal energy associated with a fuel cell enables the successful application to vehicles. Two methods are described to insulate a box containing the fuel cell (i.e., the "hot box"), while cooling the exterior surface of the fuel cell system sufficiently to keep the vehicle trunk floor at about 45° C. or less. One method comprises employing active insulation where the insulation is porous to air such that air can be pushed through the insulation, into the hot box, thereby sweeping the heat exiting the hot box back into the hot box. Another method of insulation comprises passive insulation, such as a vacuum gap between the inner and outer surface of the hot box with a substance preferably disposed in the vacuum space to shield the transfer of heat from the interior to the exterior of the hot box. These methods can be used alone or in combination.

Figure 1:
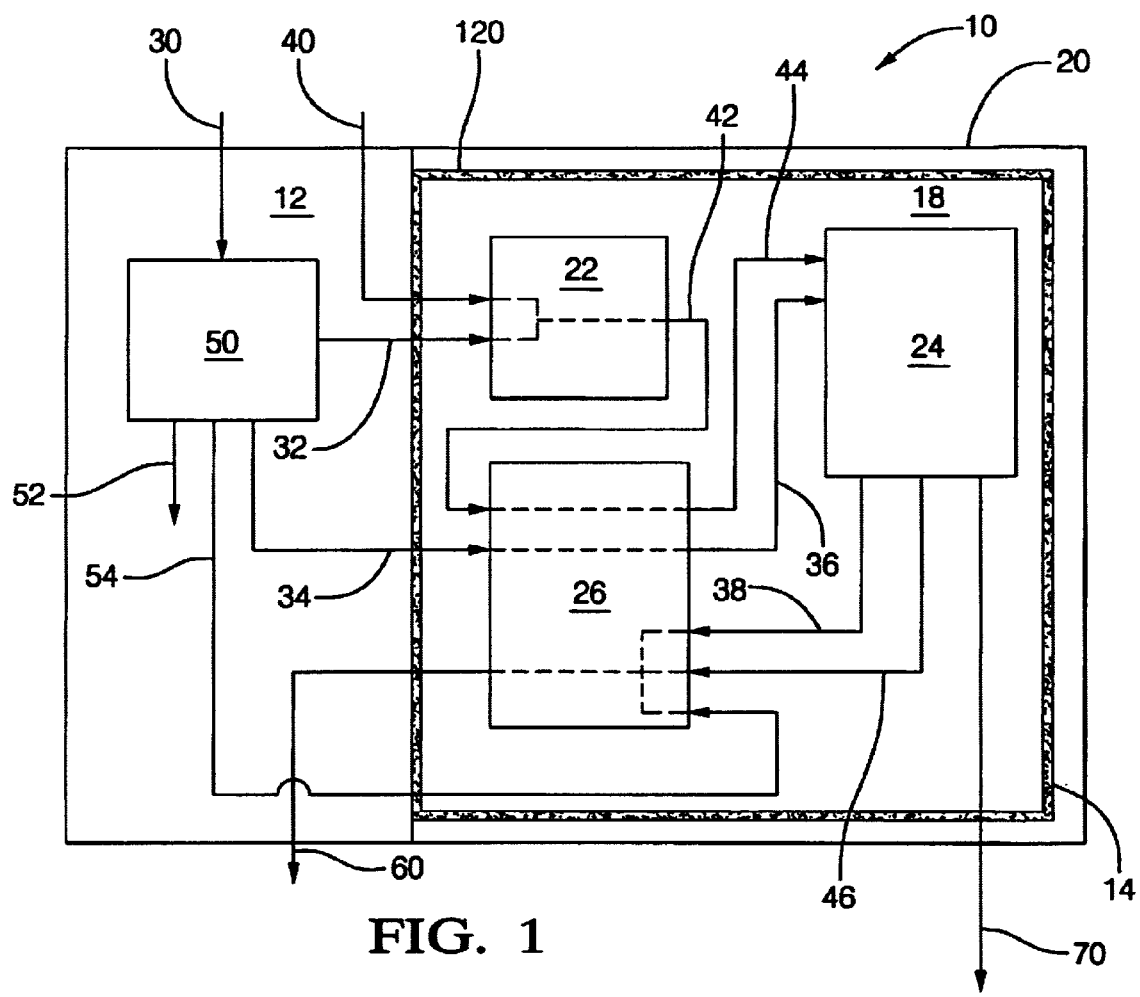
FIG. 1 is a schematic of an exemplary fuel cell system.

Referring now to FIG. 1, a general mechanization of a fuel cell system 10 is schematically depicted. The system enclosure 20 comprises a main plenum chamber 12, an intermediate plenum 102, an insulation chamber 14, a hot box chamber 18. The main plenum chamber 12 can comprise the process air supply section 50. The hot box chamber 18 can comprise a reformer system 22, a fuel cell stack 24, and a waste energy recovery assembly (or heat exchanger) 26.

Figure 2:
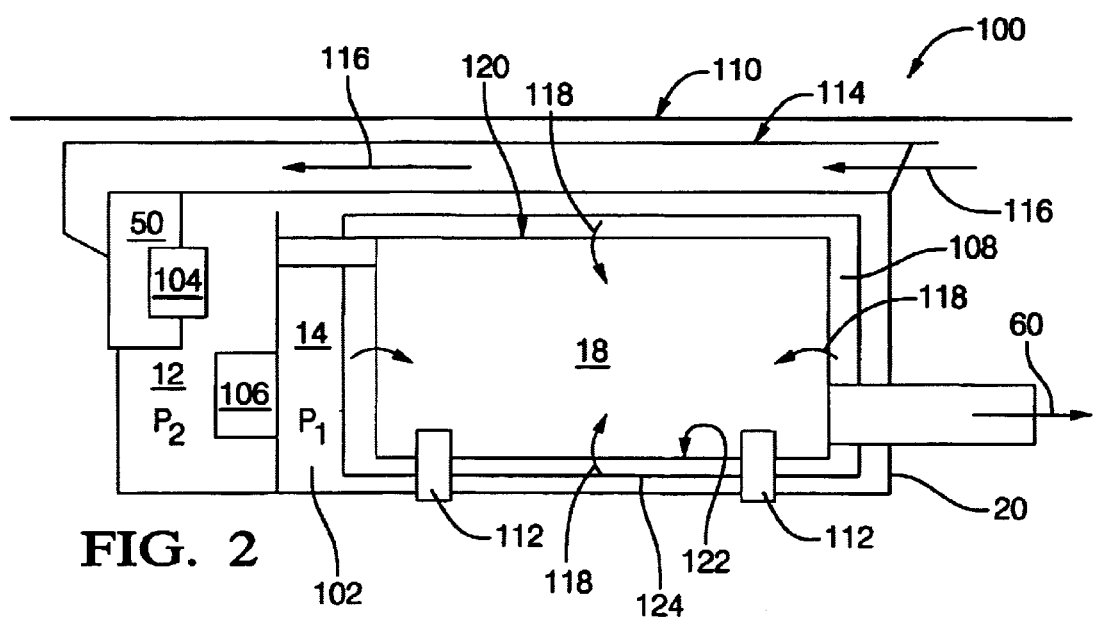
FIG. 2 is a schematic of a thermal management system.

Referring now also to FIG. 2, the fuel cell system incorporating thermal management 100 is illustrated. The thermal management system 100 can comprise: hot box chamber 18; system enclosure (or trunk box) 20; process air system 50 having air blower 104; and a thermal control blower 106.

The system enclosure 20 is the mechanical structure that preferably encapsulates the fuel cell system 10 and that is employed to connect the fuel cell system 10 to a vehicle at a vehicle-mounting surface 110. Surface 114 of enclosure 20 is near vehicle surface 110. Below (i.e., inside) surface 114 is preferably a passage for airflow 116 between the hot box chamber 18 and the surface 114. The system enclosure 20 includes the hot box chamber 18, the insulation chamber 14, and the intermediate chamber 102 that is maintained at a specified pressure $P_1$ and the main plenum chamber 12 that operates at a higher pressure $P_2$. Disposed within the main plenum chamber 12 is the process air system 50, the air blower 104, the thermal control blower 106, and various control valves, sensors, and actuators (not shown) used to operate the fuel cell system 10.

The process air system 50 pumps air 116 into the main plenum chamber 12 such that the thermal control blower 106 can move a portion of the air from the main plenum chamber 12 to the intermediate chamber 102 and through insulation chamber 14 into the hot box chamber 18, as shown by air flow arrows 118. Thus, sweeping heat back into the hot box chamber 18. The thermal control blower 106 can comprise any blower, compressor or the like,, capable of flowing gas at a sufficient flow rate and pressure to move air through intermediate chamber 102, the holes in the outer insulation chamber wall 122, the insulation 108, and the inner insulation chamber wall 124 into the hot box chamber 18. The thermal control blower 106 should be a variable speed blower to allow for the air flow to be adjusted. The hot box chamber 18 can be surrounded by the insulation plenum 14 that is preferably porous, perforated, or otherwise allows the transfer of air there through (e.g., comprises holes or the like), it preferably comprises an inner 122 and an outer 124 wall with optional insulation 108 there between. The walls can comprise any material capable of withstanding the fuel cell system 10 operating temperatures and exposure to the various system gases. Some possible materials include ferrous materials such as stainless steel, and the like; ceramics, and the like, as well as oxides, alloys, and combinations comprising at least one of the foregoing materials.

The porosity of the wall(s) is dependent upon the desired amount of cooling, the amount and type of insulation (if any) employed between the walls, and the desired pressure drop through the walls. The pores (or openings or holes) of the wall(s) can be any geometry and size that meets the above criteria, and can be distributed randomly or in a pattern. Typically, the holes have a rounded geometry, although a multi-sided or irregular geometry is feasible. The size of the holes can be up to a millimeter (mm) or so, with a size of about 0.90 mm or less preferred, and a size of about 0.75 mm or less even more preferred. It is further preferred that the hole have a diameter of about 0.10 mm or greater to inhibit clogging, with a size of about 0.20 mm or greater more preferred and about 0.25 mm or greater especially preferred. The distance between the holes is typically up to a distance equivalent or greater than 0.5 times the distance from the outer wall to the inner wall, with a distance of less than about 20 mm apart possible, and a distance of less than about 15 mm apart typical. Preferably, the holes are spaced a distance of about 2 mm apart or more, with a distance of about 5 mm or more preferred, and a distance of about 7.5 mm or more especially preferred.

In order to prevent the inner wall 122 and the outer wall 124 from contacting and to provide additional structural integrity, one or more spacers/supports can be disposed therebetween. Possible supports include insulation or structural materials. Such materials can comprise ceramics, glasses, metals (such as dielectric metal), and the like, as well as alloys, oxides, cermets, composites, and combinations comprising at least one of the foregoing supports. These supports can also comprise any geometry and may optionally physically contact both walls, spanning the distance between the walls. Possible geometries include multisided and rounded, such as square, rectangular, triangular, hexagonal, oblong, circular, spherical, irregular shapes, and the like, as well as combinations comprising at least one of the foregoing geometries, e.g., small glass beads.

Optionally, disposed between the inner 122 and outer 124 walls of the insulation chamber 14, is an insulation 108 capable of withstanding the temperatures of the inner wall 122 that can reach and even exceed about 1,000° C., while the surface of the hot box chamber 18 can reach and even exceed about 200° C. This insulation 108 preferably provides a radiation and/or conductive thermal barrier to help contain the thermal energy and maintain the outer wall 124 at a temperature of about 90° C. or so, with a temperature of about 80° C. or less preferred, and a temperature of about 60° C. or less more preferred, and about 45° C. or less especially preferred. Possible insulations include foam insulations, fiber insulations, vacuum foil insulations (e.g., foils comprising vacuum packs with air passages disposed between consecutive sheets of foil and/or through non-vacuum pack areas of the foils, and the like), aerogels, micro-porous insulations, radiation shields, an emissivity coating(s) over part of all of at least one surface (wherein the emissivity coating reduces the emisivity of the coated surface), and the like, as well as combinations comprising at least one of the foregoing insulations. The insulations can also be employed in any fashion. For example, a combination of the insulations can comprise an arrangement of two or more different types of insulation, with the insulation having the highest heat stability disposed adjacent the inner wall 122.

The amount of insulation, namely the thickness, is dependent upon the effectiveness and desired skin temperature on the surfaces of the enclosure 20, especially on the surface 114 adjacent to the vehicle surface 110. Due to general space concerns, the minimal amount of insulation (i.e., the thickness of the hot box wall (from inner wall to outer wall)), is preferably employed. Possible hot box chamber (and hence insulation) thickness' can exceed about 100 mm. However, a thickness of about 75 mm or less is preferred, with a thickness of about 50 mm or less more preferred, and a thickness of about 25 mm or less even more preferred for most vehicle applications.

In the alternative, solid walls with a vacuum therebetween can be used in addition to porous walls and insulation. Utilizing a vacuum between the walls of the insulation chamber 14 impedes convective and conductive heat transfer from within the hot box chamber 18. Reduction of heat transfer reduces the amount of airflow 116 needed to reduce the temperature of the exterior surface of the enclosure 20 to the desired level, and therefore reduces the requirements of the thermal control blower 106.

During operation of the fuel cell system, the thermal management system 100 limits the temperature of surface 114, and helps to reduce the startup time needed to reach operating temperatures inside the hot box chamber 18. This is accomplished using the thermal control blower 106 to direct air into intermediate chamber 102.

In order to attain the desired surface cooling, a significant amount of air is employed. The desired flow rate of air can be determined using the following equation:

$$m = \frac{P}{\Delta T \times C_p}$$

where:
 $C_p$=heat capacity of air at 1.004 J/gK
 P=thermal power emitted from the outer wall (W)
 $\Delta T$=change in temperature (K) of the air
 m=mass flow (g/sec)

For example, if the thermal power emitted from the outer wall is 500 watts (W), the change in air temperature is 10° C. and the mass flow is 50 grams per second (g/sec). In another example, if a vacuum insulation is employed, having a thickness of about about 30 mm, the thermal energy emitted from the top of the insulation chamber wall 124 would be about 140 W. Consequently, the airflow needed to reduce the surface temperature to about 40° C. would be about 14 g/sec.

When employing active cooling, the air from the thermal control blower 106 will pass over the surface of insulation chamber wall 124 and through the walls 122, 124, resulting in a decreased mass flow of air. The mass flow of air needed with active insulation can be determined using the following equation:

$$m = \frac{KA}{C_p t}$$

where:
 m=mass flow (g/sec)
 K=insulation thermal conductivity (w/mK)
 A=area of the insulation (m$^2$)
 $C_p$=heat capacity of air (equal to 1 J/gK)
 t=insulation thickness (m)

For example, if the insulation thermal conductivity is 0.08 watts per meter degree Kelvin (w/mK) (e.g., thermal conductivity of fiber insulation), and the area of the insulation is measured half way between the inner and outer walls 122, 124, is 1.55 square meters (m$^2$), and the insulation 108 thickness is 0.045 meters (m), then the mass flow needed for cooling the entire hot box would be about 2.8 g/sec (i.e., a volume of about 5.3 cubic feet per minute (cfm) at standard conditions). Therefore, by utilizing active insulation at a proper flow rate, an insulated hot box chamber 18 that loses about 2,100 watts of thermal energy to the environment, could have that loss reduced to about 0 watts due to the returning of the thermal energy back to the hot box chamber 18.

The active cooling can be employed to not only maintain the outer surface of the insulation chamber wall 124 at a desired temperature, but to also manage the temperature within the hot box, e.g., under full power conditions. When the airflow is decreased, then a portion of the thermal energy passes through the insulation 108, heating up the outer insulation chamber wall 124 of the insulation chamber 14. Likewise, if the airflow is increased, the air will flow into the interior of the hot box chamber 18, further cooling the hot box chamber 18.

The thermal management system has the advantage of controlling the overall thermal transfer rate of fuel cell system. Not only does the thermal management system enable control of the hot box external surface temperature during operation of the fuel cell system, it allows the hot box to maintain a desired temperature for a greater period of time post shut-down. Slower system cooling after shut-down enables faster start-up times for a greater period. As stated above, during operation of the fuel cell system, the thermal control blower 106 would introduce air, alone or in combination with external air, to the hot box. The air would both cool the surface and preferably pass into the hot box to sweep heat back into the hot box. The air would then preferably exit the hot box through the waste energy recovery unit, and optionally directly through an exhaust passage. When the system is placed on stand-by or shut-down, the thermal control blower 106 would similarly be on stand-by or shut-down, only operating when the hot box surface temperatures approached or exceeded a desired temperature (i.e., based upon information obtained by temperature sensors). By decreasing the rate that heat is transferred out of the hot box, the thermal management system (e.g., the insulation, radiation shield(s), thermal blower air flows and the like) also reduce the rate at which the fuel cell system cools down; the thermal energy is retained in the hot box after shutdown. The cool down rate is described in the following equation:

$$CoolDownRate = Mass \times SpecificHeat/HeatLoss$$

where:
 Mass=100 kg
 Specific Heat=460 J/kg° C.
 Heat Loss using active cooling=2,000 Watts Therefore, the cool down rate is equal to 23 seconds per ° C. (s/° C.), or about 2.6° C. per minute (° C./min). Therefore, if the minimum startup temperature is about 200° C. below the shutdown temperature, the fuel cell system can be quickly restarted up to about 1.25 hours after shutdown (i.e., 200° C. divided by 2.6° C. per minute equals 77 minutes). Further, due to the use of the reformer during the shut-down period, the time will actually exceed 1.25 hours.

In addition to the thermal management system, the fuel cell system comprises a process air supply section 50, a reformer 22, a fuel cell stack 24, and a waste energy recovery assembly 26. (See FIG. 1) In operation, a supply of air 30, preferably exterior to the system enclosure 20, provides air to the process air supply section 50 located within the main plenum chamber 12. The process air supply section 50 can optionally comprises a main blower (not shown) and air control valves (not shown). A supply of fuel 40, exterior to the system enclosure 20, as well as air 32 from the process air supply section 50, is typically directed to the reformer 22 that produces a reformate 42. Distribution of the reformate 42 can optionally be accomplished with a reformate control valve (not shown) controlled by an actuator (e.g., electrical, hydraulic, mechanical, or the like; not shown). The supply (or stream) of reformate 42 created in the reformer system 22 can be directed to the waste energy recovery assembly 26 and/or directly to the fuel cell stack 24.

In the waste energy recovery assembly 26, the reformate 42, along with an air/oxidant (cathode) supply 34 from the process air supply 50, is heated (e.g., heated anode supply 44 and heated cathode supply 36) prior to introduction to the fuel cell stack 24. Within the fuel cell stack, the reformate and oxidant are reacted to produce electricity 70. The byproducts, i.e., the anode exhaust 46 and cathode exhaust 38, optionally along with an additional source of air 54, are preferably directed from the fuel cell stack 24 through the waste energy recovery assembly 26 prior to exiting the fuel cell system as byproduct stream 60.

The fuel cell stack 24 can be a SOFC multi-layer ceramic/metal composite structure design to produce electricity 70 at an operating temperature of about 600° C. to about 1,000° C., with an operating temperature of about 800° C. to about 1,000° C. preferred. The stack can comprise one or more multi-cell modules (electrically arranged in series or in parallel) that are mounted to a common gas distribution manifold. Each module produces a specific voltage that is a function of the number of cells in the module. Electrical attachment of the fuel cell stack 24 is accomplished by way of electrodes at the base and top of each module that lead out of the hot box chamber 18 and system enclosure 20 to the vehicle power bus and system (not shown). The output voltage and current is controlled by the combination of these modules, the air/fuel control system, and the electric load applied to the fuel cell system 10.

To facilitate electricity production in the fuel cell, a direct supply of fuel, such as hydrogen, carbon monoxide, or methane, is preferred. However, concentrated supplies of these fuels are generally expensive and difficult to supply. Therefore, the fuel can be supplied by processing, e.g., in a reformer, a more complex source of the fuel. The fuel utilized in the system is typically chosen based upon the application, expense, availability, and environmental issues relating to the fuel. Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and synthetic fuels, such as synthetic fuels produced from methane, methanol, coal gasification or natural gas conversion to liquids, and combinations comprising at least one of the foregoing methods, and the like; and combinations comprising at least one of the foregoing fuels. The preferred fuel is typically based upon the power density of the engine, with lighter fuels (i.e., those which can be more readily vaporized and/or conventional fuels which are readily available to consumers) generally preferred.

The processing (or reforming) of hydrocarbon fuels, such as gasoline, is completed to provide an immediate fuel source for rapid start up of the solid oxide fuel cell, as well as protecting the solid oxide fuel cell by removing impurities. Fuel reforming in a reformer system 22 (e.g., a main reformer and, optionally, a micro-reformer) can be used to convert a hydrocarbon (such as gasoline) or an oxygenated fuel (such as methanol) into a reformate (e.g., hydrogen and carbon monoxide) and byproducts (e.g., carbon dioxide and water). Common approaches include steam reforming, partial oxidation, dry reforming, and the like, as well as combinations comprising at least one of the foregoing approaches.

From the reformer 22, at least a portion of the reformate 42 is preferably heated in the waste energy recovery assembly 26 that recovers thermal energy (e.g., exothermic reaction heat from the fuel cell stack 24) and optionally converts chemical energy (e.g., contained in the reformate) to input thermal energy for the fuel cell stack 24 through the use of an integrated catalytic combustion zones and/or heat exchangers.

During operation of the fuel cell stack 24, reformer 22, and waste energy recovery assembly 26, thermal energy is produced that causes heating of the hot box chamber 18 surrounding these components. In order to employ a fuel cell system in a vehicular application, the overall temperature of the hot box should be controlled to avoid adversely effecting vehicle components adjacent to the fuel cell system. The described thermal management methods facilitate employment of the fuel cell system in a vehicle while employing low cost materials in a minimum package size. Low heat is input into the vehicle (e.g., a contact surface of about 40° C., with non-contacting surfaces being about 80° C.), while the majority of the heat is directed to the exhaust (about 2,000 watts). The thermal management system also provides for faster startups of the fuel cell system.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel cell transportation vehicle thermal management system, comprising:
   a chamber comprising insulation and a fuel cell stack in fluid communication with a reformer inside said chamber having a first pressure lower than a second pressure outside said chamber;
   a system enclosure disposed around said chamber; and
   a process air system in fluid communication with at least one surface of said chamber.

2. The system of claim 1, wherein said chamber further comprises a waste energy recovery system.

3. The system of claim 1, wherein said process air system is further in communication with an interior of said chamber through at least one wall that comprises an opening selected from the group consisting of pores and holes, said opening has a diameter of about one millimeter or less.

4. The system of claim 3, wherein said chamber further comprises an outer wall and an inner wall.

5. The system of claim 4, wherein a distance between two of said openings is about 0.5 times the distance from said outer wall to said inner wall or greater.

6. The system of claim 3, wherein said distance is about 2 to about 20 millimeters apart.

7. The system of claim 6, wherein said distance is about 5 to about 15 millimeters apart.

8. The system of claim 7, where said distance is about 7.5 to about 15 millimeters apart.

9. The system of claim 1, wherein said process air system is capable of reducing a temperature of said surface to about 90° C. or less.

10. The system of claim 1, wherein said chamber has an outer wall and an inner wall with a vacuum between said outer wall and said inner wall.

11. The system of claim 1, wherein said chamber further comprises an insulation selected from the group consisting of foam insulations, fiber insulations, vacuum foil insulations, aerogels, micro-porous insulations, radiation shields, emissivity coating, and combinations comprising at least one of the foregoing insulations.

* * * * *